United States Patent
Keener et al.

(10) Patent No.: US 8,227,064 B2
(45) Date of Patent: *Jul. 24, 2012

(54) PRESSURE-SENSITIVE ADHESIVE TAPE WITH MONOFILAMENT WARP YARNS

(75) Inventors: Phillip R. Keener, Chapin, SC (US); Wesley A. Daniels, Jr., Evans, GA (US); Charles B. Jenkinson, Jr., Evans, GA (US); Carl Gadson, Union, SC (US)

(73) Assignee: Milliken & Company, Spartanburg, SC (US)

( * ) Notice: Subject to any disclaimer, the term of this patent is extended or adjusted under 35 U.S.C. 154(b) by 488 days.

This patent is subject to a terminal disclaimer.

(21) Appl. No.: 12/381,026

(22) Filed: Mar. 6, 2009

(65) Prior Publication Data

US 2010/0227102 A1    Sep. 9, 2010

(51) Int. Cl.
*B32B 9/00* (2006.01)
*B32B 33/00* (2006.01)
*B32B 7/12* (2006.01)

(52) U.S. Cl. ...................... 428/40.1; 428/343

(58) Field of Classification Search .......... 428/40.1, 428/41.8, 43, 343, 352, 354
See application file for complete search history.

(56) References Cited

U.S. PATENT DOCUMENTS

| | | | |
|---|---|---|---|
| 2,750,314 A | 6/1956 | Bemmels | 154/53.5 |
| 2,750,316 A | 6/1956 | Bemmels | 154/53.5 |
| 3,073,734 A | 1/1963 | Bemmels | 154/53.5 |
| 3,690,978 A | 9/1972 | Nishizawa et al. | 156/167 |
| 3,991,754 A | 11/1976 | Gertzman | 128/156 |
| 4,160,057 A | 7/1979 | Kogan et al. | 428/245 |
| 4,302,500 A | 11/1981 | Flora | 428/284 |
| 4,303,724 A | 12/1981 | Sergeant et al. | 428/229 |
| 4,304,813 A | 12/1981 | Elmore, Jr. | 428/253 |
| 4,439,482 A | 3/1984 | Suematsu | 428/252 |
| 4,798,200 A | 1/1989 | Warthen et al. | 128/89 R |
| 5,017,425 A | 5/1991 | Sanders | 428/253 |
| 5,047,285 A | 9/1991 | Ward | 428/229 |
| 5,931,798 A | 8/1999 | Green et al. | 602/6 |
| 5,985,438 A | 11/1999 | Watanabe | 428/343 |
| 6,211,099 B1 * | 4/2001 | Hutto et al. | 442/2 |
| 6,254,954 B1 | 7/2001 | Bennett et al. | 428/41.8 |
| 6,410,464 B1 | 6/2002 | Menzies et al. | 442/151 |
| 6,435,220 B1 | 8/2002 | Smith et al. | 139/383 R |
| 6,699,801 B1 * | 3/2004 | Kawaguchi et al. | 442/2 |

(Continued)

FOREIGN PATENT DOCUMENTS

EP    1 865 040    12/2007

(Continued)

OTHER PUBLICATIONS

Patent Cooperation Treaty PCT International Search Report. Date of Mailing, May 12, 2010, International Application No. PCT/US2010/000180, International Filing Date, Jan. 25, 2010.

*Primary Examiner* — Patricia Nordmeyer
(74) *Attorney, Agent, or Firm* — Cheryl J. Brickey

(57) ABSTRACT

The pressure-sensitive adhesive tape containing a woven reinforcement fabric and a pressure-sensitive adhesive on one side of the woven fabric reinforcement. The woven reinforcement fabric contains weft yarns and monofilament warp yarns. The woven fabric reinforcement contains between about 30 and 100 ends per inch and the monofilament warp yarns have a linear mass density of between about 20 and 100 denier.

12 Claims, 1 Drawing Sheet

U.S. PATENT DOCUMENTS

| | | | |
|---|---|---|---|
| 6,787,488 B2 | 9/2004 | Takagi et al. | 442/110 |
| 7,181,933 B2 | 2/2007 | Callaway et al. | 66/193 |
| 7,285,505 B2 | 10/2007 | Callaway et al. | 442/304 |
| 7,465,283 B2 | 12/2008 | Grim et al. | 602/8 |
| 2005/0158539 A1 | 7/2005 | Murphy et al. | 428/343 |
| 2006/0154546 A1 | 7/2006 | Murphy et al. | 442/286 |
| 2006/0155226 A1 | 7/2006 | Grim et al. | 602/6 |
| 2007/0184735 A1 | 8/2007 | Yun et al. | 442/149 |
| 2007/0184736 A1 | 8/2007 | Seitz et al. | 442/151 |
| 2009/0094922 A1* | 4/2009 | Newton et al. | 52/417 |

FOREIGN PATENT DOCUMENTS

| | | |
|---|---|---|
| WO | WO 00/05443 | 2/2000 |
| WO | WO 2007/022097 | 2/2007 |

* cited by examiner

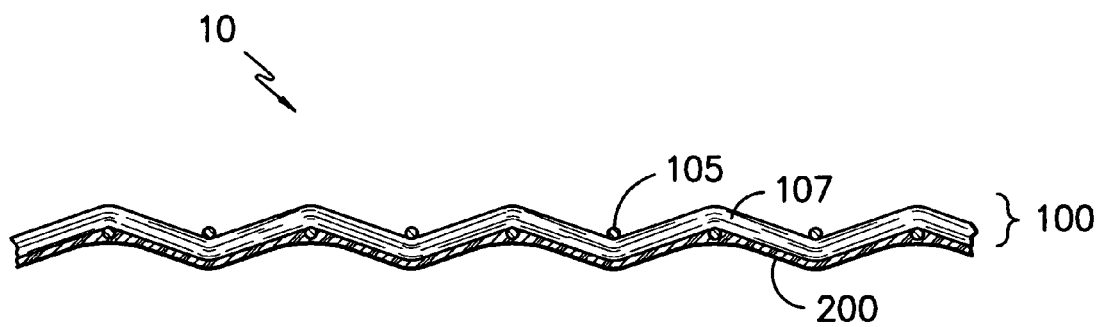

PRESSURE-SENSITIVE ADHESIVE TAPE WITH MONOFILAMENT WARP YARNS

TECHNICAL FIELD

The present disclosure relates to an improved substrate for pressure sensitive adhesive tapes, which utilizes a woven reinforcement fabric having monofilament warp yarns.

BACKGROUND

Adhesive tapes are commonly constructed of one or more layers of fabric and are sold to consumers in rolls containing several feet of material wrapped around a core. The person who uses the tape must then cut or tear a small length of material from the roll, often no more than an inch or two, as needed from time to time. Tearing off such a small length of tape by hand, without the aid of a scissors or other sharp edged instrument, is a typically a vexing task, which often results in failure and a tangled mess.

Additionally, woven fabrics for use in pressure-sensitive adhesive tapes typically utilize warp yarns which require slashing which sizes or coats the yarns with protective ingredients that allow the yarns to be woven into fabrics. The most common fabrics use spun yarns made from cotton or polyester/cotton blends that must be spun, warped, and slashed prior to weaving. This slashing adds additional steps and cost to the product. In many cases, the end product requires the removal of the sizing materials prior to converting the fabric to tape.

Thus there is a need for a woven fabric for use in a pressure-sensitive tape application having both easy tear-ability and no need for sizing and size removal.

BRIEF SUMMARY

The present invention provides a pressure-sensitive adhesive tape containing a woven reinforcement fabric and a pressure-sensitive adhesive on one side of the woven fabric reinforcement. The woven reinforcement fabric contains weft yarns and monofilament warp yarns. The woven fabric reinforcement contains between about 30 and 100 warp ends per inch and the monofilament warp yarns have a linear mass density of between about 20 and 100 denier.

BRIEF DESCRIPTION OF THE DRAWINGS

FIG. 1 illustrates schematically a cross-section of an exemplary pressure-sensitive adhesive tape.

DETAILED DESCRIPTION

Referring now to FIG. 1, there is shown an embodiment of the pressure-sensitive adhesive tape 10 having a woven reinforcement fabric 100 and a pressure-sensitive adhesive 200 on one side of the woven fabric 100. This tape 10 may be used in multiple pressure-sensitive adhesive tape applications, including but not limited to, duct tape, double sided tape, harness wrap, medical tape, athletic tape, or any tape requiring a full face fabric The term pressure-sensitive adhesive tape as referred to above and below describes supported or unsupported, essentially two-dimensional articles such as sheets, strips, ribbons or die-cut parts (i.e., the extension of the articles in two directions distinctly exceeds the extension in the third direction).

The woven reinforcement fabric 100 is selected to give the desired tear strength, tearing characteristics, tensile strength, and cover. The tape 10 is generally torn across the warp yarns, but at times is torn across the filling yarns. Smooth, easy tear is more closely related to the tear characteristics of the individual warp yarns and the close proximity of each warp yarn to each other. Ideal tear characteristic is similar to the smooth action of a zipper. Preferably, the woven reinforcement fabric 100 has a tensile strength of between about 5 lbs/inch and 80 lbs/inch preferably between 25 and 60 lbs/inch and a cover of between about 8 and 100 gm/m$^2$.

The woven reinforcement fabric 100 contains continuous monofilament warp yarns 105. The monofilament warp yarn 105 may have any cross-sectional shape including round, elliptical, square, tear-shaped, crescent-shaped, rectangular, regular or irregular, and multi-lobal. For tape shaped monofilaments, the monofilaments may be extruded having a rectangular shaped cross-section or may be formed from an oriented or un-oriented polymer sheet that is then slit into tape shaped monofilaments. It has been found that monofilament yarns deliver higher tensile by weight than spun yarns which delivers an economic benefit. The monofilament warp yarns 105 have a linear mass density of between about 20 and 100 denier, more preferably between about 30 and 70 denier. Having a low denier warp yarn has been shown to produce tapes 10 having good tear properties. The woven fabric 100 has a warp constructions having between about 30 and 100 ends per inch. In another embodiment, the woven fabric 100 has between about 30 and 80 ends per inch, more preferably between about 30 and 70 ends per inch. In one embodiment, the warp yarns have an elongation at break of about 5% to 50%, more preferably about 10% to 25%.

It has been found that the monofilament warps 105 may be woven in a wide range of fabrics without additional preparation requirements or sizing. Preferably, the warp yarns 105 have no sizing or other protective ingredients and are not subjected to a slashing operation.

The warp yarns 105 may be any suitable material including but not limited to man-made fibers such as polyethylene, polypropylene, polyesters (polyethylene terephthalate, polybutylene terephthalate, polytrimethylene terephthalate, polylactic acid, and the like, including copolymers thereof); nylons (including nylon 6 and nylon 6,6); regenerated cellulosics (such as rayon or Tencel); elastomeric materials such as LYCRA®; and high-performance fibers such as the polyaramids, polyimides, PEI, PBO, PBI, PEEK, liquid-crystalline, thermosetting polymers such as melamine-formaldehyde (Basofil) or phenol-formaldehyde (Kynol) and the like.

The weft yarns 107 in the woven reinforcement fabric 100 may be of any suitable construction. The weft yarns 107 may be continuous or staple and may be monofilament, multifilament, or spun. The characteristics of the weft yarns are selected based on the need of the final tape product. In one embodiment, the weft yarns 107 are spun and in another embodiment the multifilament yarns are textured. The woven fabric 100 preferably has weft constructions having between about 5 and 100 picks per inch, more preferably between about 15 and 50 picks per inch. In one embodiment, the weft yarns 107 are between about 40 and 300 denier. If spun yarns are used as the weft yarns 107, then preferably the spun yarns are between about 40/1 to 10/1.

The weft yarns 107 may be any suitable material including but not limited to man-made fibers such as polyethylene, polypropylene, polyesters (polyethylene terephthalate, polybutylene terephthalate, polytrimethylene terephthalate, polylactic acid, and the like, including copolymers thereof); nylons (including nylon 6 and nylon 6,6); regenerated cellulosics (such as rayon); elastomeric materials such as LYCRA®; and high-performance fibers such as the polyaramids, polyimides, PEI, PBO, PBI, PEEK, liquid-crystalline, thermosetting polymers such as melamine-formaldehyde or phenol-formaldehyde and the like. The weft yarns may also be natural fibers such as cotton; coir; bast fibers such as linen, ramie, and hemp; proteinaceous materials such as silk, wool, and other animal hairs such as angora, alpaca, or vicuna. Blends of man-made fibers, natural fibers, or both types of fibers are anticipated, such as cotton/polyester blends.

The woven reinforcement fabric 100 is preferably a full face fabric having a small percentage of the surface area being "open" which means that there are very few areas in the fabric 100 having holes where there are no yarns in that area. Preferably, the fabric 100 has less than 15% open area, more preferably less than 10%, more preferably less than 5% open area. While the fabric 100 has a low percentage open area, because the warp yarns have such low surface area because they are low denier monofilament yarns, the full face fabric 100 still has a high air permeability, preferably greater than 200 ft$^3$/min at 125 Pascal back pressure.

In one embodiment, the pressure-sensitive adhesive 200 is applied to the fabric 100 such that the adhesive fills in a small percentage of the open area of fabric and thus does not significantly affect the air permeability of the pressure-sensitive adhesive tape 10. In this embodiment, the air permeability is reduced no more than 50%. In a second embodiment, the pressure-sensitive adhesive 200 is applied to the fabric 100 such that a large number or essentially all of the open surface area of the fabric 100 is filled with adhesive. This provides a low air permeability or air and/or moisture imperious tape 10. In this embodiment, the air permeability of the tape 10 is less than 10% of the air permeability of the fabric 100. In one embodiment, the air permeability of the tape 10 is less than 25 ft$^3$/min at 125 Pascal back pressure.

The pressure-sensitive adhesive 200 may be any suitable pressure adhesive. Examples of pressure-sensitive adhesives that can be used in the present invention include rubber pressure-sensitive adhesives (natural rubber, polyisoprene rubber, styrene-butadiene rubber, SIS-, SBS- or SEBS-block rubber, butyl rubber, polyisobutylene rubber, reclaimed rubber), rubber gum adhesives, non-latex-based synthetic adhesives acrylic pressure-sensitive adhesives and silicone pressure-sensitive adhesives. The pressure-sensitive adhesive 200 is preferably tacky at room temperature and can be applied to a wide variety of substrates by exerting, for example, finger pressure.

The pressure-sensitive adhesive 200 may be applied to the woven fabric 100 by any suitable method, such as but not limited to, solvent coating in a continuous or discontinuous method, roller coating, air knife coating, rod coating, electrostatic coating, slide hopper coating, extrusion coating, blade coating, curtain coating, and slide coating. In one embodiment, the reinforcement fabric 100 is calendared with a natural rubber.

In one embodiment, the pressure-sensitive adhesive tape 10 has a release liner on the pressure-sensitive adhesive 200 on the side opposite the woven fabric 100. The release liner should be chosen such that the release liner may easily be stripped off the tape 10 without damaging the tape 10. Examples of suitable materials for use as a release liners include, e.g., paper (e.g., kraft paper), polymer films (e.g., polyethylene, polypropylene and polyester), composite liners, and combinations thereof that may optionally have a silicone or silicone containing material, a fluorinated or fluorine-containing material, or a fluorosilicone material on at least one of the surfaces. One example of a useful release liner is a fluoroalkyl silicone polycoated paper. In some constructions, the release liner includes a kraft paper sandwiched between two polymer films that have been treated to exhibit release properties. Release liners can optionally include a variety of markings and indicia including, e.g., lines, art work, brand indicia, and other information.

In one embodiment, the woven fabric 100 may have a thermoplastic layer on the side of the fabric 100 opposite the adhesive 200. This thermoplastic layer is preferably polyethylene and allows the pressure-sensitive adhesive tape 10 to be used in applications such as duct tape.

Other additives may be present in the warp yarns, weft yarns, and/or adhesive to provide other properties to the tape 10. These other additives include, but are not limited to colorants, flame retardants, antimicrobial agents, wetting agents, surfactants, and odor control agents.

In one embodiment, woven fabric reinforcement may be constructed from 60 denier continuous monofilament polyester terephthalate warp yarns having no sizing agents and 150 denier multifilament polyester terephthalate weft yarns. The woven fabric would be constructed of 80 ends per inch and 40 picks per inch utilizing a plain type weave. The woven fabric reinforcement would be coated with an adhesive to form a pressure-sensitive adhesive tape. The resultant pressure-sensitive tape is predicted to have a tensile strength of approximately 40 lbs/inch.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A hand tearable pressure-sensitive adhesive tape comprising:
- a woven reinforcement fabric comprising warp yarns being monofilament yarns and weft yarns in a woven construction, wherein the woven fabric reinforcement comprises between about 30 and 100 warp ends per inch, wherein the monofilament warp yarns have a linear mass density of between about 20 and 100 denier, wherein the fabric has a tensile strength of between 25 and 60 lbs/inch, and wherein the fabric contains less than 15% open area; and,
- a pressure-sensitive adhesive on one side of the woven fabric reinforcement.

2. The hand tearable pressure-sensitive adhesive tape of claim 1, further comprising a release liner on the pressure-sensitive adhesive on the side of the adhesive opposite the woven fabric reinforcement.

3. The hand tearable pressure-sensitive adhesive tape of claim 1, wherein the monofilament warp yarns do not contain a sizing agent.

4. The hand tearable pressure-sensitive adhesive tape of claim 1, wherein the woven fabric reinforcement comprises between about 15 and 50 filling picks per inch.

5. The hand tearable pressure-sensitive adhesive tape of claim 1, wherein the woven fabric reinforcement comprises between about 20 and 80 warp ends per inch.

6. The hand tearable pressure-sensitive adhesive tape of claim 1, wherein the woven fabric reinforcement comprises between about 30 and 70 warp ends per inch.

7. The hand tearable pressure-sensitive adhesive tape of claim 1, wherein the weft yarns comprise monofilament yarns.

8. The hand tearable pressure-sensitive adhesive tape of claim 1, wherein the weft yarns comprise multifilament yarns.

9. The hand tearable pressure-sensitive adhesive tape of claim 1, wherein the weft yarns are spun yarns.

10. The hand tearable pressure-sensitive adhesive tape of claim 1, wherein the warp and weft yarns comprise polyester.

11. The hand tearable pressure-sensitive adhesive tape of claim 1, wherein the fabric contains less than 10% open area.

12. The hand tearable pressure-sensitive adhesive tape of claim 1, wherein the fabric contains less than 5% open area.

* * * * *